April 6, 1926.  
F. W. ZINK  
1,579,907  
MIRROR SUPPORT  
Filed June 5, 1922

Inventor  
Fred W. Zink  
By Whittemore, Hulbert, Whittemore & Belknap  
Attorneys Patented Apr. 6, 1926.

1,579,907

UNITED STATES PATENT OFFICE.

FRED W. ZINK, OF DETROIT, MICHIGAN, ASSIGNOR TO KALES STAMPING COMPANY, OF DETROIT, MICHIGAN, A CORPORATION OF MICHIGAN.

MIRROR SUPPORT.

Application filed June 5, 1922. Serial No. 565,841.

*To all whom it may concern:*

Be it known that I, FRED W. ZINK, a citizen of the United States of America, residing at Detroit, in the county of Wayne and State of Michigan, have invented certain new and use Improvements in Mirror Supports, of which the following is a specification, reference being had therein to the accompanying drawings.

This invention relates to mirror supports and more particularly to supports for rear view mirrors upon vehicles.

The invention consists in the structural features and arrangement of parts hereinafter described and illustrated in the accompanying drawings, wherein:—

Figure 1:
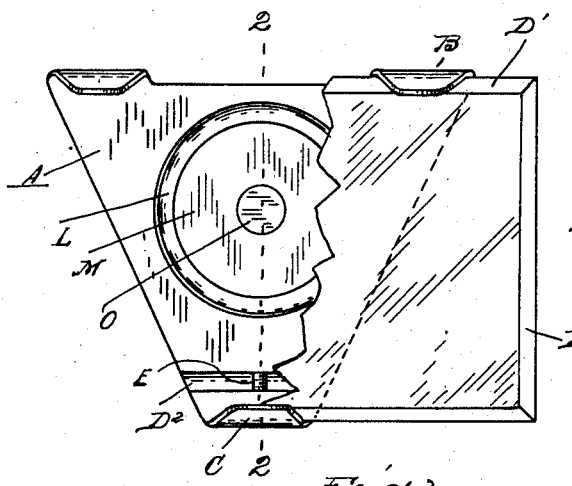
Figure 1 is a front view of the improved support showing a portion of an engaged mirror.
Figure 2:
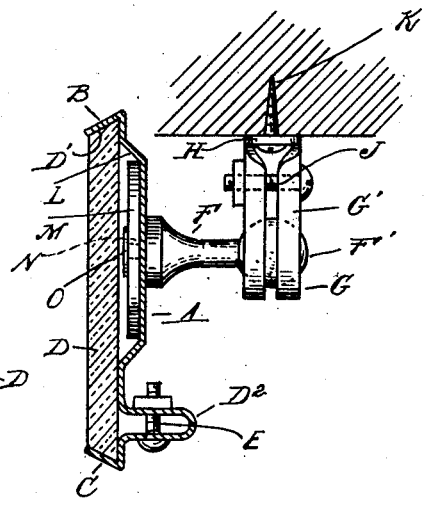
Figure 2 is a vertical sectional view of the same taken upon line 2—2 of Figure 1.
Figure 3:
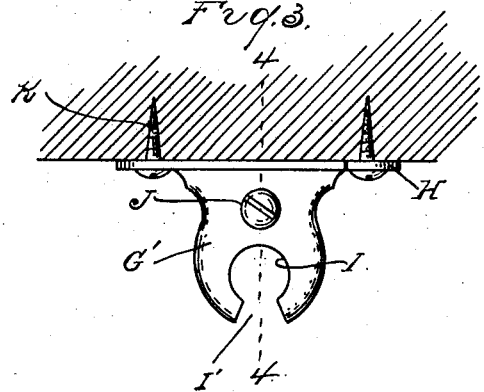
Figure 3 is a front view of the bracket whereon the support is adjustably mounted.
Figure 4:
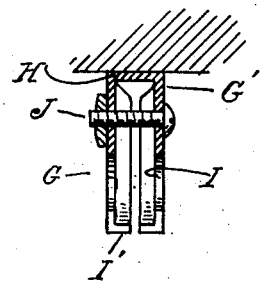
Figure 4 is a section on line 4—4 of Figure 3.

In these views the reference character A designates a sheet metal plate preferably triangular in form and having at one edge integral tongues bent forwardly to form a pair of clamping claws B which are adapted to coact with a claw C upon the apex of said plate opposite said edge to respectively engage opposed margins of a mirror D. The edges of the latter are preferably bevelled, as indicated at D' to permit the claws B and C to more securely embrace the mirror. Adjacent the claw C the plate A is formed with a rearwardly return-bend or arched portion D², the legs of which are connected by a clamping bolt E whereby said legs may be drawn together to correspondingly draw together the claws B and C whereby the latter may be firmly engaged with the mirror. F is a supporting arm rigidly attached to the plate A and projecting rearwardly therefrom, said arm terminating in a ball shaped head F' which is adapted to be clamped between complementary side plates G' of a bracket G, said bracket having the supporting base H integral with said side plates. The latter are formed with circular apertures I wherein the ball head F' seats, the diameters of said apertures being considerably less than that of the ball. Preferably the plates G' are formed with slots I' opening into the apertures I at the free ends of said plates, the width of said slots being considerably less than the diameters of the apertures. J is a clamping bolt connecting the plates G' and stressing the same toward each other to embrace the ball head F' and K is a pair of screws whereby the bracket G is mounted.

The pressure exerted by the plates G' upon the ball head F' is sufficient to securely maintain any desired position of adjustment of the arm F with respect to the bracket G but does not prevent manual shifting of said arm and the mirror which it carries to any other desired position of adjustment. The slots I' opening into the apertures I increase the range of adjustment of the mirror since they permit the arm F to swing into or through said slots.

As a preferred means for securing the arm F to the plate A, the latter is formed with a substantially central circular rearward indentation L and a disk M disposed in the pocket, thus formed, is centrally pierced by a reduced shank N upon the arm F, which shank is riveted down upon the disk M, as indicated at O. This establishes a strong end rivet joint. The clamping means formed by the bolts E engaging the return-bend D² will allow a sufficient relative adjustment of the clamping claws B and C to permit engagement of mirrors varying considerably in their dimensions between the margins engaged by said claws.

What I claim as my invention is:—

1. A mirror support comprising a one piece plate having tongues formed at opposed edges bent to adapt them for clamping engagement with a mirror, said plate having an integral rearwardly projecting open return-bent portion extending between its edges transverse to the clamping edges, and a clamping member engaging the legs of the return-bend for drawing the same together to correspondingly draw the clamping tongues into firm engagement with the mirror.

2. The combination with a mirror, of a support therefor comprising a plate having tongues for gripping said mirror, said plate having an open return-bent portion, means for adjusting the sides of said return-bent portion to adjust the tongues aforesaid with respect to said mirror, an arm secured to said plate, and means for supporting said arm whereby said mirror may be adjusted.

3. The combination with a mirror, of a support therefor comprising a plate, tongues extending from said plate at the upper and lower edges thereof and gripping said mirror, said plate having an open return-bent portion, means for adjusting the sides of said return-bent portion to adjust the tongues aforesaid with respect to said mirror, an arm extending through said plate, means for securing said arm to said plate, and means for supporting said arm whereby said mirror may be adjusted.

4. The combination with a mirror, of a plate having tongues for gripping said mirror, means for adjusting said tongues with respect to said mirror, said plate having a shallow depressed portion, a disc-like member located in said depressed portion, and means connected to said member for supporting said mirror.

5. The combination with a mirror, of a support therefor comprising a plate having tongues for gripping said mirror, said plate also having an integral rearwardly projecting open return-bent portion extending transversely thereof between said tongues, and means for adjusting the sides of said return-bent portion for correspondingly adjusting said tongues with respect to said mirror.

In testimony whereof I affix my signature.

FRED W. ZINK.